(12) United States Patent
Tainaka

(10) Patent No.: US 8,473,705 B2
(45) Date of Patent: Jun. 25, 2013

(54) MEMORY ACCESS APPARATUS

(75) Inventor: Kouji Tainaka, Osaka (JP)

(73) Assignee: SANYO Electric Co., Ltd., Moriguchi-shi (JP)

(*) Notice: Subject to any disclaimer, the term of this patent is extended or adjusted under 35 U.S.C. 154(b) by 636 days.

(21) Appl. No.: 12/607,447

(22) Filed: Oct. 28, 2009

(65) Prior Publication Data

US 2010/0115212 A1    May 6, 2010

(30) Foreign Application Priority Data

Nov. 5, 2008    (JP) .................................. 2008-283895

(51) Int. Cl.
*G06F 12/00* (2006.01)
*G06F 13/00* (2006.01)
*G06F 13/28* (2006.01)

(52) U.S. Cl.
USPC ............................................ 711/167; 710/25

(58) Field of Classification Search
None
See application file for complete search history.

(56) References Cited

U.S. PATENT DOCUMENTS

| | | | |
|---|---|---|---|
| 5,253,356 A * | 10/1993 | Yamadate et al. | 710/22 |
| 5,485,594 A | 1/1996 | Foster | |
| 5,564,008 A | 10/1996 | Foster | |
| 5,634,034 A | 5/1997 | Foster | |
| 2002/0078294 A1 | 6/2002 | Tsuchida et al. | |
| 2002/0161981 A1 | 10/2002 | Tsuchida et al. | |
| 2003/0033490 A1 * | 2/2003 | Gappisch et al. | 711/150 |
| 2003/0105916 A1 | 6/2003 | Tsuchida et al. | |
| 2004/0078515 A1 | 4/2004 | Tsuchida et al. | |

FOREIGN PATENT DOCUMENTS

| | | |
|---|---|---|
| JP | 6-12537 A | 1/1994 |
| JP | 6-96030 A | 4/1994 |
| JP | 9-251793 A | 9/1997 |
| JP | 2000-137983 A | 5/2000 |
| JP | 2006-330806 A | 12/2006 |

* cited by examiner

*Primary Examiner* — Christian P Chace
*Assistant Examiner* — Gary W Cygiel
(74) *Attorney, Agent, or Firm* — Westerman, Hattori, Daniels & Adrian, LLP (57) ABSTRACT

A memory access apparatus is provided with a processor, an interface (I/F) circuit, and a memory control circuit. The processor is provided with an access-request generating circuit which issues a memory access request. The I/F circuit is provided with a flip-flop (F/F) circuit which holds the memory access request outputted from the processor in response to a clock signal. The memory control circuit is provided with an access processing circuit which executes an access process that complies with the memory access request held by the F/F circuit.

4 Claims, 7 Drawing Sheets

(A) CLOCK (B) ADDRESS to F/F24 — ADRS (C) VARIOUS TYPES OF CONTROL INFORMATION to F/F26-30 — CTL (D) ADDRESS from F/F24 — ADRS (E) VARIOUS TYPES OF CONTROL INFORMATION from F/F26-30 — CTL (F) READ DATA(1 WORD) — DATA (G) STATE DETERMINING SIGNAL to F/F38

(H) STATE DETERMINING SIGNAL from F/F38

(I) 1st READY/BUSY to AND GATE 40

(J) RESPONSE SIGNAL from AND GATE 40

(K) 2nd READY/BUSY to F/F32

(L) 2nd READY/BUSY from F/F32

FIG.6

(A) CLOCK (B) ADDRESS to F/F24

| ADRS1 | ADRS2 | ADRS3 |

(C) VARIOUS TYPES OF CONTROL INFORMATION to F/F26-30

| CTL |

(D) ADDRESS from F/F24

| ADRS1 | ADRS2 | ADRS3 |

(E) VARIOUS TYPES OF CONTROL INFORMATION from F/F26-30

| CTL |

(F) WRITE DATA (3 WORD) to F/F22

| DATA1 | DATA2 | DATA3 |

(G) WRITE DATA (3 WORD) from F/F22

| DATA1 | DATA2 | DATA3 |

(H) STATE DETERMINING SIGNAL to F/F38

(I) STATE DETERMINING SIGNAL from F/F38

(J) 1st READY/BUSY to AND GATE 40

(K) RESPONSE SIGNAL from AND GATE 40

(L) 2nd READY/BUSY to F/F32

(M) 2nd READY/BUSY from F/F32

FIG.7

MEMORY ACCESS APPARATUS

CROSS REFERENCE OF RELATED APPLICATION

The disclosure of Japanese Patent Application No. 2008-283895, which was filed on Nov. 5, 2008, is incorporated herein by reference.

BACKGROUND OF THE INVENTION

1. Field of the Invention

The present invention relates to a memory access apparatus. More particularly, the present invention relates to a memory access apparatus which executes an access process that complies with a memory access request issued by a processor in cooperation with a memory control circuit.

2. Description of the Related Art

According to one example of this type of apparatus, a plurality of requests respectively issued from a plurality of request sources are arbitrated by an arbiter. A memory access circuit writes desired data in an SDRAM when a writing request is approved by the arbiter. Moreover, the memory access circuit reads out the desired data from the SDRAM when a reading-out request is approved by the arbiter.

However, in the above-described apparatus, a delay occurs to a transfer operation of requests resulting from a quality of a signal line which links the request source and the arbiter, and this delay may sometimes prevent speeding-up of a memory access process.

SUMMARY OF THE INVENTION

According to the present invention, a memory access apparatus provided with a processor, an interface (I/F), and a memory control circuit, in which the processor comprises an issuer which issues a memory access request, the I/F comprises a first holder which holds the memory access request issued by the issuer in response to a clock signal, and the memory control circuit comprises a processor which executes an access process that complies with the memory access request held by the first holder.

Preferably, the memory control circuit further comprises a first outputter which outputs a first ready/busy signal by referring to a process state of the processor, the I/F further comprises a creator which creates a response signal based on the memory access request issued by the issuer and the first ready/busy signal outputted by the first outputter, and the processor further comprises a second outputter which outputs a second ready/busy signal based on the response signal created by the creator.

More preferably, the I/F further comprises a second holder which holds the second ready/busy signal outputted by the second outputter in response to the clock signal, and the processor executes the access process by referring to the second ready/busy signal held by the second holder.

Preferably, the creator includes a first signal creator which creates a state identifying signal which identifies a state of the memory access request held by the first holder and a second signal creator which creates the response signal by performing an AND operation on the state identifying signal created by the first signal creator and the first ready/busy signal outputted by the first outputter.

Preferably, the memory access request includes word count information in which a word count of access data is written, and the first signal creator creates the state identifying signal different depending on the word count information.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
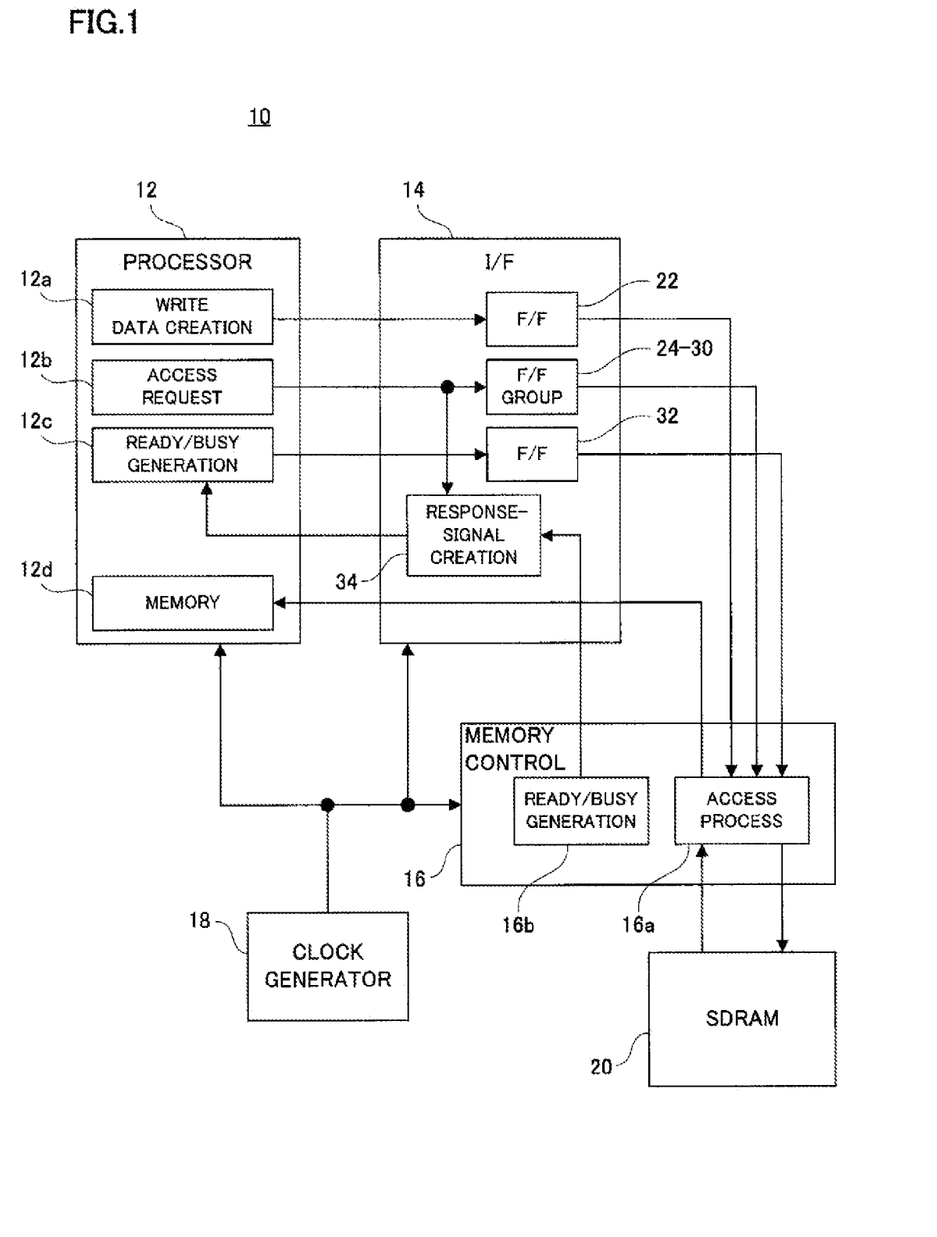
FIG. 1 is a block diagram showing a configuration of one embodiment of the present invention.

With reference to FIG. 1, a memory access apparatus 10 according to this embodiment includes a clock generator 18 which generates a clock signal. For the purpose of timing control, the clock signal generated by the clock generator 18 is applied to a processor 12, an interface (I/F) circuit 14, and a memory control circuit 16.

An access-request generating circuit 12b arranged in the processor 12 issues a memory access request toward the I/F circuit 14 when executing writing data in an SDRAM 20 and reading out the data from the SDRAM 20. The issued memory access request is temporarily held by F/F circuits 24 to 30 arranged in the I/F circuit 14, and thereafter, outputted toward an access processing circuit 16a of the memory control circuit 16. The access processing circuit 16a writes desired data in the SDRAM 20 or reads out desired data accommodated in the SDRAM 20 according to the memory access request applied from the I/F circuit 14.

The desired data that is subject to data writing is created by a WRITE-data creating circuit 12a arranged in the processor 12, undergoes an F/F circuit 22 arranged in the I/F circuit 14, and is applied to the access processing circuit 16a. Moreover, the desired data read-out from the SDRAM 20 by the access processing circuit 16a undergoes the I/F circuit 14, is applied to the processor 12, and then, is written in a memory 12d arranged in the processor 12.

A READY/BUSY generating circuit 16b arranged in the memory control circuit 16 refers to an access process executed by the access processing circuit 16a so as to create a first ready/busy signal, and outputs the created first ready/busy signal toward the I/F circuit 14. A response-signal creating circuit 34 arranged in the I/F circuit 14 creates a response signal based on the above-described memory access request applied from the processor 12 and the first ready/busy signal applied from the READY/BUSY generating circuit 16b, and applies the created response signal to the processor 12.

A READY/BUSY generating circuit 12c in the processor 12 creates a second ready/busy signal based on the response signal applied from the I/F circuit 14. The created second ready/busy signal undergoes a flip-flop (F/F) circuit 32 arranged in the I/F circuit 14, and then, is applied to the access processing circuit 16a in the memory control circuit 16. The access processing circuit 16a refers to the applied second ready/busy signal so as to execute the access process. By the first ready/busy signal and the second ready/busy signal thus exchanged, a coordination is secured between the processor 12 and the memory control circuit 16.

Figure 2:
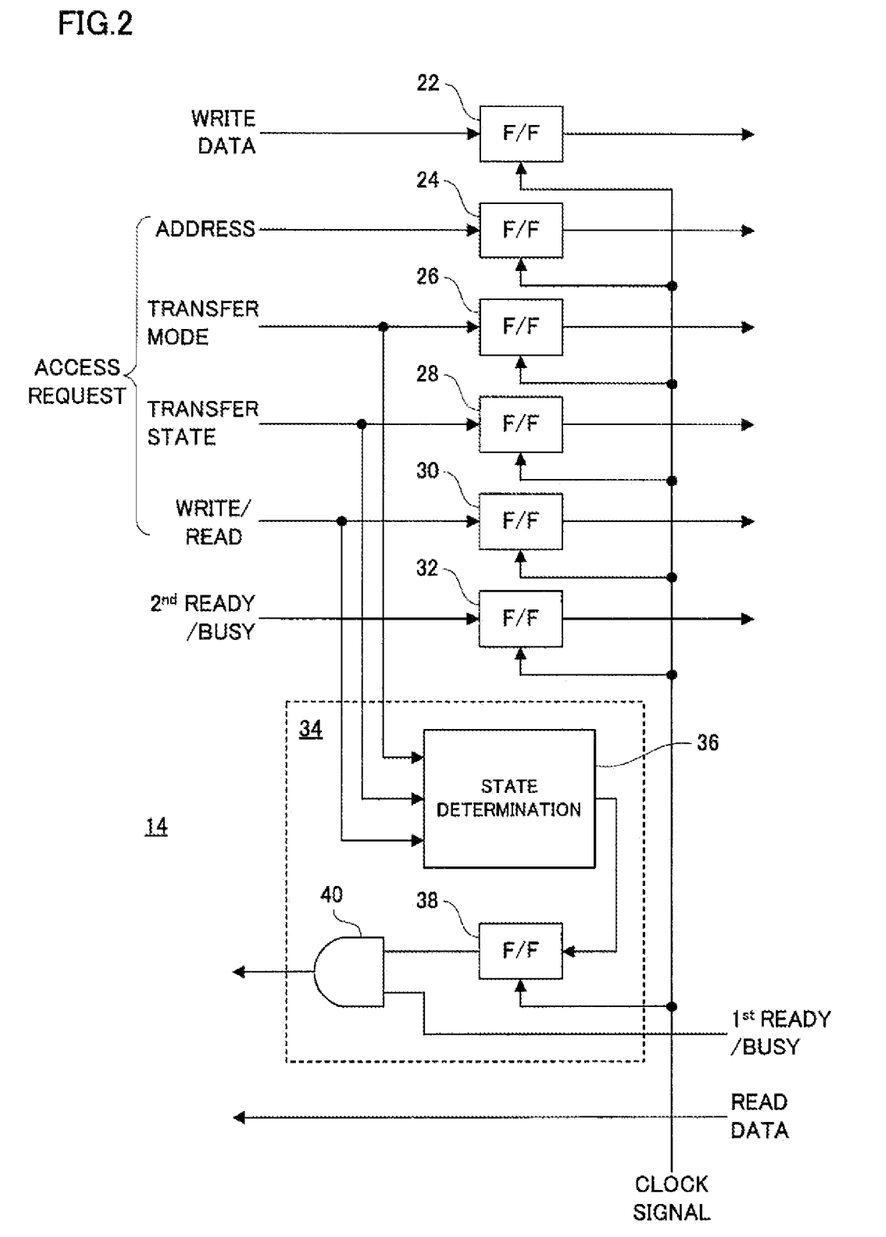
FIG. 2 is a block diagram showing one example of a configuration of an I/F applied to the embodiment in FIG. 1.

The I/F circuit 14 is configured as shown in FIG. 2. The memory access request applied from the processor 12 includes address information, transfer mode information, transfer state information, and writing/reading-out information. In the address information, an access-destination address is written. In the transfer mode information, information for identifying whether a word count of data that is subject to writing/reading-out is either "one word" or "two or more words" is written. In the transfer state information, information for identifying whether data relating to current writing/reading-out is either a "first word" or a "second and subsequent words" is written. In the writing/reading-out information, information for identifying whether an access this time is either "data-writing" or "data-reading" is written.

The address information undergoes the F/F circuit 24, and then, is outputted to the memory control circuit 16. The transfer mode information undergoes the F/F circuit 26, and then, is outputted to the memory control circuit 16. The transfer state information undergoes the F/F circuit 28, and then, is outputted to the memory control circuit 16. The writing/reading-out information undergoes the F/F circuit 30, and then, is outputted to the memory control circuit 16. It is noted that the transfer mode information, the transfer state information, and the writing/reading-out information are collectively defined as "various types of control information".

The various types of control information are also applied to a state determining circuit 36. The state determining circuit 36 determines a current access request state based on the applied various types of control information, and outputs a state determining signal. The outputted state determining signal is applied to an AND gate 40 via an F/F circuit 38. The AND gate 40 performs an AND operation on the state determining signal applied from the F/F circuit 38 and the first ready/busy signal applied from the memory control circuit 16 so as to create a response signal, and outputs the created response signal toward the processor 12.

It is noted, as described above, that the data subject to the data writing is outputted to the memory control circuit 16 via the F/F circuit 22, the second ready/busy signal is outputted to the memory control circuit 16 via the F/F circuit 32, and the data read out from the SDRAM 20 is outputted as it is to the processor 12. Moreover, the F/F circuits 22 to 32 and 38 execute F/F operations in synchronization with the clock signal outputted from the clock generator 18.

Figure 3:
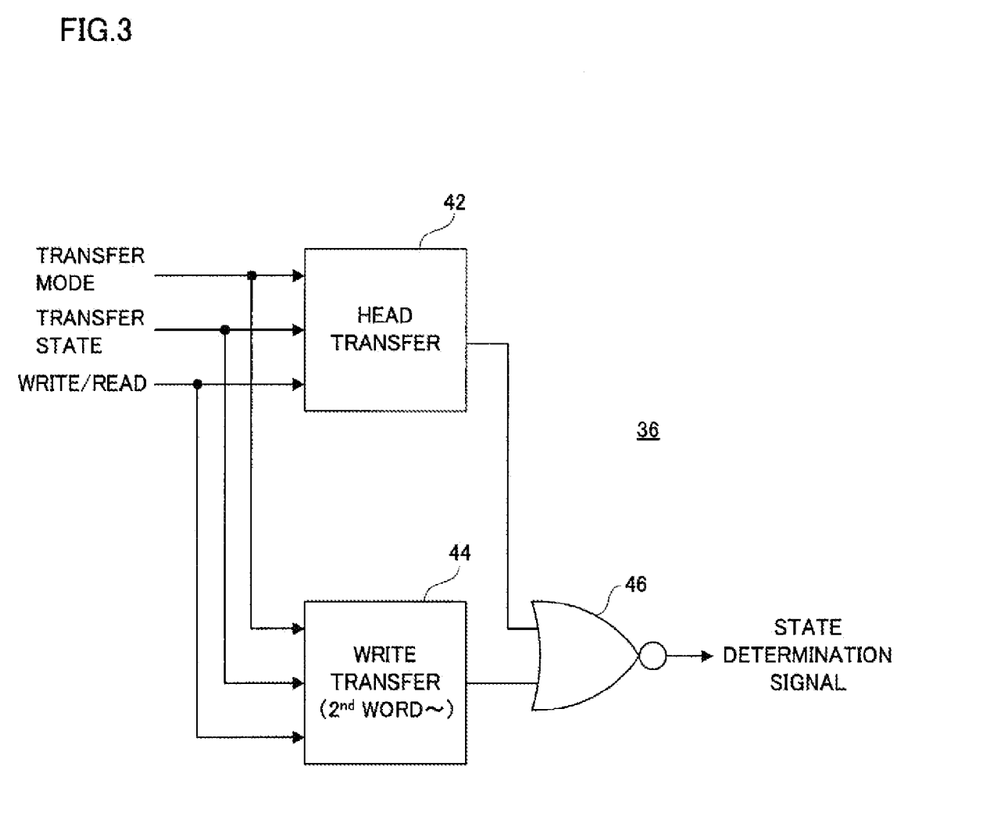
FIG. 3 is a block diagram showing one example of a configuration of a state determining circuit applied to an embodiment in FIG. 2.

The state determining circuit 36 is configured as shown in FIG. 3. The various types of control information are applied to each of a head transferring circuit 42 and a writing transferring circuit 44. The head transferring circuit 42 and the writing transferring circuit 44 output "0" or "1" according to a manner shown in Table 1.

TABLE 1

| (1) Head transfer | (2) Writing transfer (2nd and subsequent words) | (3) State determining signal |
|---|---|---|
| 1 | x | 0 |
| x | 1 | 0 |
| 0 | 0 | 1 |

According to Table 1, the head transferring circuit 42, when each of data writing and data reading-out is executed, outputs "1" corresponding to a first-word memory access request. Moreover, the writing transferring circuit 44, when the data writing is executed, outputs "1" corresponding to a 2nd-and-subsequent-words memory access request.

The outputs of the head transferring circuit 42 and the writing transferring circuit 44 are subjected to an exclusive logical OR process by an EXOR circuit 46. The arithmetic result is outputted, as a state determining signal, from the EXOR circuit 46.

For reference, operations to be noticed in Table 1 are shown in Table 2 corresponding to each of the data reading-out and the data writing.

TABLE 2

| Writing/reading-out | Transfer length | Operations to be noticed in Table 1 |
|---|---|---|
| Reading-out | All | (1) |
| Writing | One word | (1) |
| Writing | Two or more words | (1) and (2) |

According to Table 2, in the data reading-out, irrespective of the word count, only the output operation of the head transferring circuit 42 is noticed. On the other hand, in the data writing, when the word count is "1", only the output operation of the head transferring circuit 42 is noticed, and when the word count is "2 or more", the output operations of both of the head transferring circuit 42 and the writing transferring circuit 44 are noticed.

As a result, 1-word data writing is executed according to a manner shown in FIG. 4(A) to FIG. 4(M), and 1-word data reading-out is executed according to a manner shown in FIG. 5(A) to FIG. 5(L). Moreover, 3-word data writing is executed according to a manner shown in FIG. 6(A) to FIG. 6(M), and 3-word data reading-out is executed according to a manner shown in FIG. 7(A) to FIG. 7(L).

Figure 4:
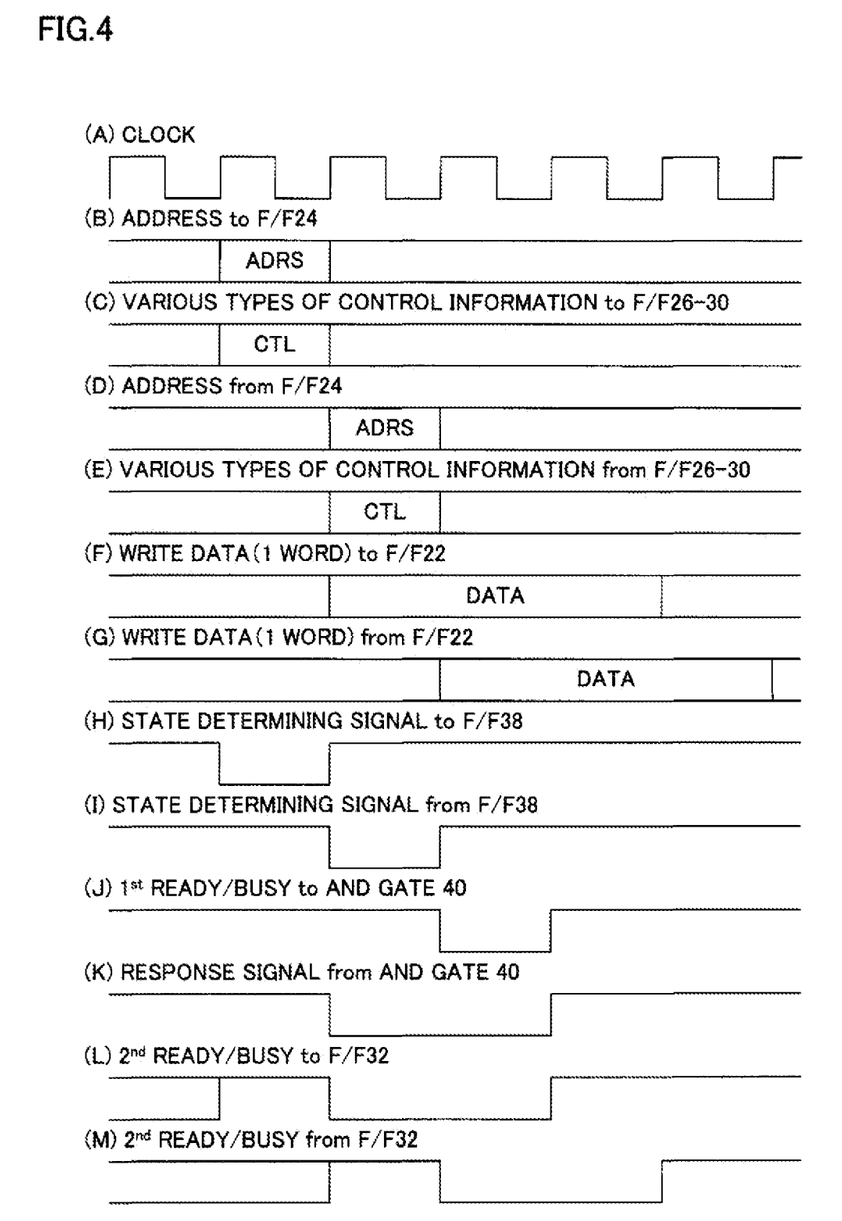
FIG. 4(A) is a timing chart showing one example of an output operation of a clock.
FIG. 4(B) is a timing chart showing one example of an output operation of an address from a processor.
FIG. 4(C) is a timing chart showing one example of an output operation of various types of control information from the processor.
FIG. 4(D) is a timing chart showing one example of an output operation of an address from an F/F circuit.
FIG. 4(E) is a timing chart showing one example of an output operation of various types of control information from the F/F circuit.
FIG. 4(F) is a timing chart showing one example of an output operation of writing data from the processor.
FIG. 4(G) is a timing chart showing one example of an output operation of the writing data from the F/F circuit.
FIG. 4(H) is a timing chart showing one example of an output operation of a state determining signal from a state determining circuit.
FIG. 4(I) is a timing chart showing one example of an output operation of the state determining signal from the F/F circuit.
FIG. 4(J) is a timing chart showing one example of an output operation of a first ready/busy signal from a memory control circuit.
FIG. 4(K) is a timing chart showing one example of an output operation of a response signal from an AND gate.
FIG. 4(L) is a timing chart showing one example of an output operation of a second ready/busy signal from the processor.
FIG. 4(M) is a timing chart showing one example of an output operation of the second ready/busy signal from the F/F circuit.

With reference to FIG. 4(A) to FIG. 4(M), when the address information and the various types of control information are applied to the F/F circuit 24 and the F/F circuits 26 to 30 at timings shown in FIG. 4(B) and FIG. 4(C) and the 1-word data subject to the writing is applied to the F/F circuits 22 at a timing shown in FIG. 4(F), the address information, the various types of control information, and the writing data are outputted from the F/F circuit 24, and the F/F circuits 26 to 30, the F/F circuit 22 at timings shown in FIG. 4(D), FIG. 4(E), and FIG. 4(G) in response to a clock signal shown in FIG. 4(A). That is, the address information, the various types of control information, and the writing data applied from the processor 12 are outputted from the I/F circuit 14 with a delay of 1-clock cycle.

The state determining circuit 36 creates a state determining signal shown in FIG. 4(H) based on various types of control information shown in FIG. 4(C). The created state determining signal is delayed by a 1-clock cycle by the F/F circuit 38, and from the F/F circuit 38, the state determining signal is outputted at a timing shown in FIG. 4(I).

The memory control circuit 16 outputs a first ready/busy signal shown in FIG. 4(J) based on the various types of control information applied from the I/F circuit 14. The AND gate 40 performs an AND operation on a state determining signal shown in FIG. 4(I) and the first ready/busy signal shown in FIG. 4(J), and outputs a response signal shown in FIG. 4(K) toward the processor 12.

The READY/BUSY generating circuit 12c arranged in the processor 12 creates a second ready/busy signal shown in FIG. 4(L) based on the response signal shown in FIG. 4(K). The created second ready/busy signal is delayed by 1-clock cycle by the F/F circuit 32. As a result, the second ready/busy signal is outputted from the F/F circuit 32 toward the memory control circuit 16 at a timing shown in FIG. 4(M).

Figure 5:
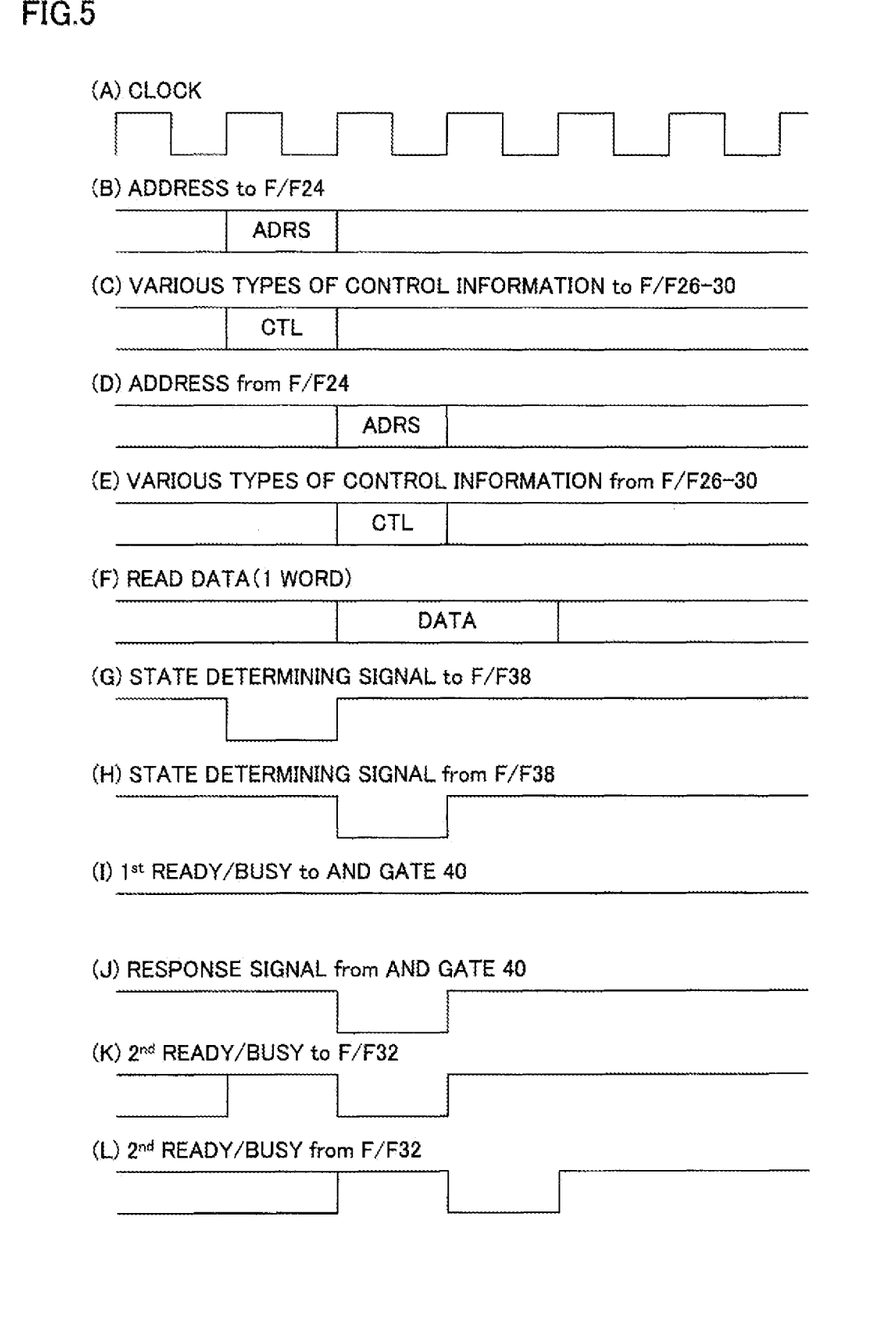
FIG. 5(A) is a timing chart showing one example of an output operation of the clock.
FIG. 5(B) is a timing chart showing one example of an output operation of an address from a processor.
FIG. 5(C) is a timing chart showing one example of an output operation of various types of control information from the processor.
FIG. 5(D) is a timing chart showing one example of an output operation of an address from an F/F circuit.
FIG. 5(E) is a timing chart showing one example of an output operation of various types of control information from the F/F circuit.
FIG. 5(F) is a timing chart showing one example of an output operation of reading-out data from a memory control circuit.
FIG. 5(G) is a timing chart showing one example of an output operation of a state determining signal from a state determining circuit.
FIG. 5(H) is a timing chart showing one example of an output operation of the state determining signal from the F/F circuit.
FIG. 5(I) is a timing chart showing one example of an output operation of a first ready/busy signal from a memory control circuit.
FIG. 5(J) is a timing chart showing one example of an output operation of a response signal from an AND gate.
FIG. 5(K) is a timing chart showing one example of an output operation of a second ready/busy signal from the processor.
FIG. 5(L) is a timing chart showing one example of an output operation of the second ready/busy signal from the F/F circuit.

With reference to FIG. 5(A) to FIG. 5(L), when the address information and the various types of control information are applied to the F/F circuit 24 and the F/F circuits 26 to 30 at timings shown in FIG. 5(B) and FIG. 5(C), the address information and the various types of control information are outputted from the F/F circuit 24 and the F/F circuits 26 to 30 at timings shown in FIG. 5(D) and FIG. 5(E) (i.e., with a delay of 1-clock cycle) in response to a clock signal shown in FIG. 5(A).

The state determining circuit 36 creates a state determining signal shown in FIG. 5(G) based on the various types of control information shown in FIG. 5(C). The created state determining signal is delayed by 1-clock cycle by the F/F circuit 38, and is outputted from the F/F circuit 38 at a timing shown in FIG. 5(H).

The memory control circuit 16 outputs a first ready/busy signal shown in FIG. 5(I) based on the various types of control information applied from the I/F circuit 14. The AND gate 40 performs an AND operation on a state determining signal shown in FIG. 5(H) and the first ready/busy signal shown in FIG. 5(I), and outputs a response signal shown in FIG. 5(J) toward the processor 12.

The READY/BUSY generating circuit 12c of the processor 12 creates a second ready/busy signal shown in FIG. 5(K) based on the response signal shown in FIG. 5(J). The created second ready/busy signal is delayed by 1-clock cycle by the F/F circuit 32, and outputted toward the memory control circuit 16 at a timing shown in FIG. 5(L).

Figure 6:
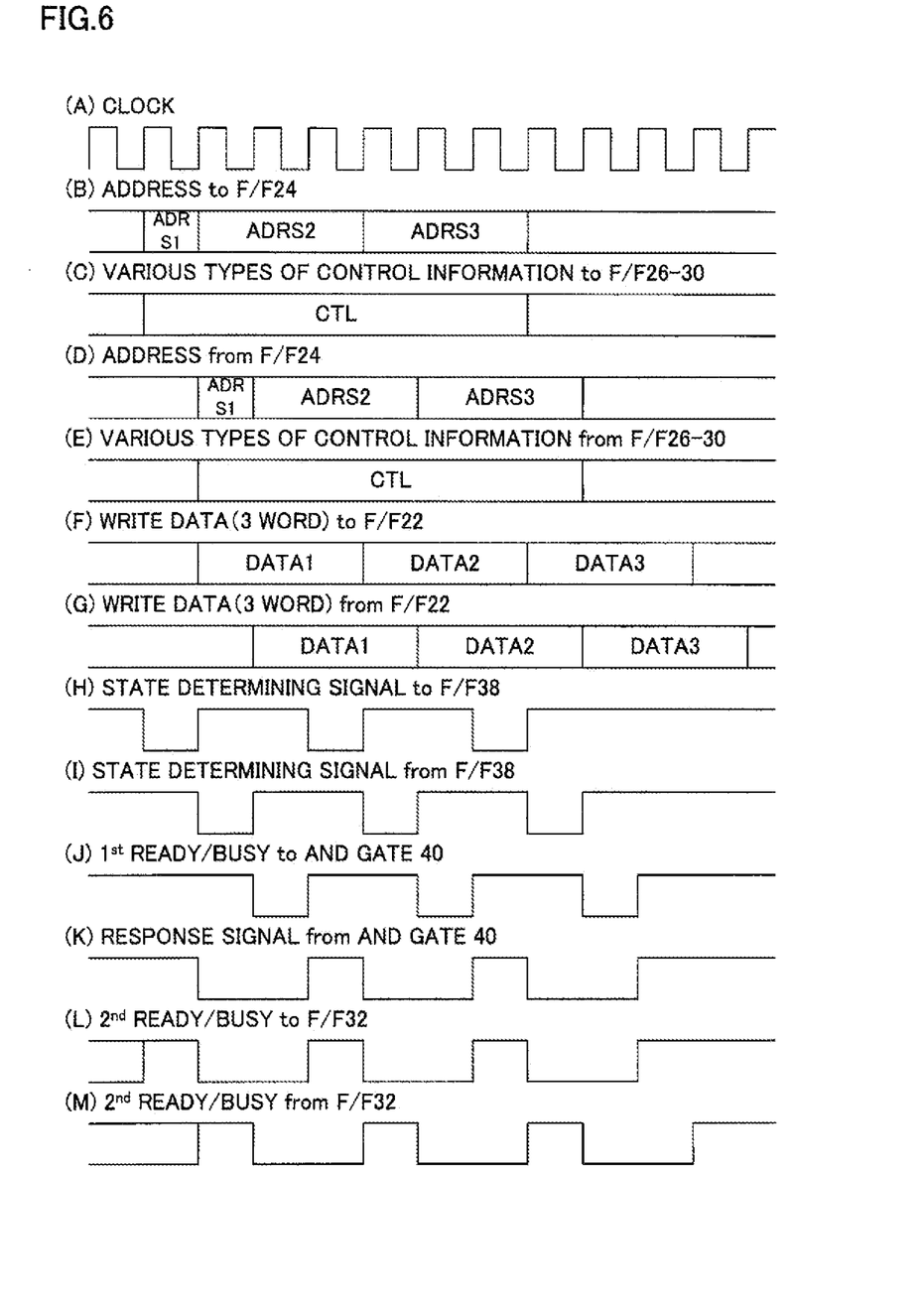
FIG. 6(A) is a timing chart showing another example of the output operation of the clock.
FIG. 6(B) is a timing chart showing another example of the output operation of the address from the processor.
FIG. 6(C) is a timing chart showing another example of the output operation of various types of control information from the processor.
FIG. 6(D) is a timing chart showing another example of the output operation of the address from the F/F circuit.
FIG. 6(E) is a timing chart showing another example of the output operation of various types of control information from the F/F circuit.
FIG. 6(F) is a timing chart showing another example of the output operation of the writing data from the processor.
FIG. 6(G) is a timing chart showing another example of the output operation of the writing data from the F/F circuit.
FIG. 6(H) is a timing chart showing another example of the output operation of the state determining signal from the state determining circuit.
FIG. 6(I) is a timing chart showing another example of the output operation of the state determining signal from the F/F circuit.
FIG. 6(J) is a timing chart showing another example of the output operation of the first ready/busy signal from the memory control circuit.
FIG. 6(K) is a timing chart showing another example of the output operation of the response signal from the AND gate.
FIG. 6(L) is a timing chart showing another example of the output operation of the second ready/busy signal from the processor.
FIG. 6(M) is a timing chart showing another example of the output operation of the second ready/busy signal from the F/F circuit.

With reference to FIG. 6(A) to FIG. 6(M), when the address information and the various types of control information corresponding to the three words are applied to the F/F circuit 24 and the F/F circuits 26 to 30 at timings shown in FIG. 6(B) and FIG. 6(C) and the 3-word data subject to the writing is applied to the F/F circuit 22 at a timing shown in FIG. 6(F), the address information, the various types of control information, and the writing data are outputted from the F/F circuit 24, the F/F circuits 26 to 30, and the F/F circuit 22 at timings shown in FIG. 6(D), FIG. 6(E), and FIG. 6(G) (i.e., with a delay of 1-clock cycle) in response to a clock signal shown in FIG. 6(A).

The state determining circuit 36 creates a state determining signal that intermittently falls three times as shown in FIG. 6(H) based on various types of control information shown in FIG. 6(C). The created state determining signal is delayed by 1-clock cycle by the F/F circuit 38, and is outputted from the F/F circuit 38 at a timing shown in FIG. 6(I).

The memory control circuit 16 outputs a first ready/busy signal shown in FIG. 6(J) based on the various types of control information applied from the I/F circuit 14. The AND gate 40 performs an AND operation on a state determining signal shown in FIG. 6(I) and the first ready/busy signal shown in FIG. 6(J), and outputs a response signal shown in FIG. 6(K) toward the processor 12.

The READY/BUSY generating circuit 12c creates a second ready/busy signal shown in FIG. 6(L) based on the response signal shown in FIG. 6(K). The created second ready/busy signal is delayed by 1-clock cycle by the F/F circuit 32. As a result, the second ready/busy signal is outputted from the F/F circuit 32 toward the memory control circuit 16 at a timing shown in FIG. 6(M).

Figure 7:
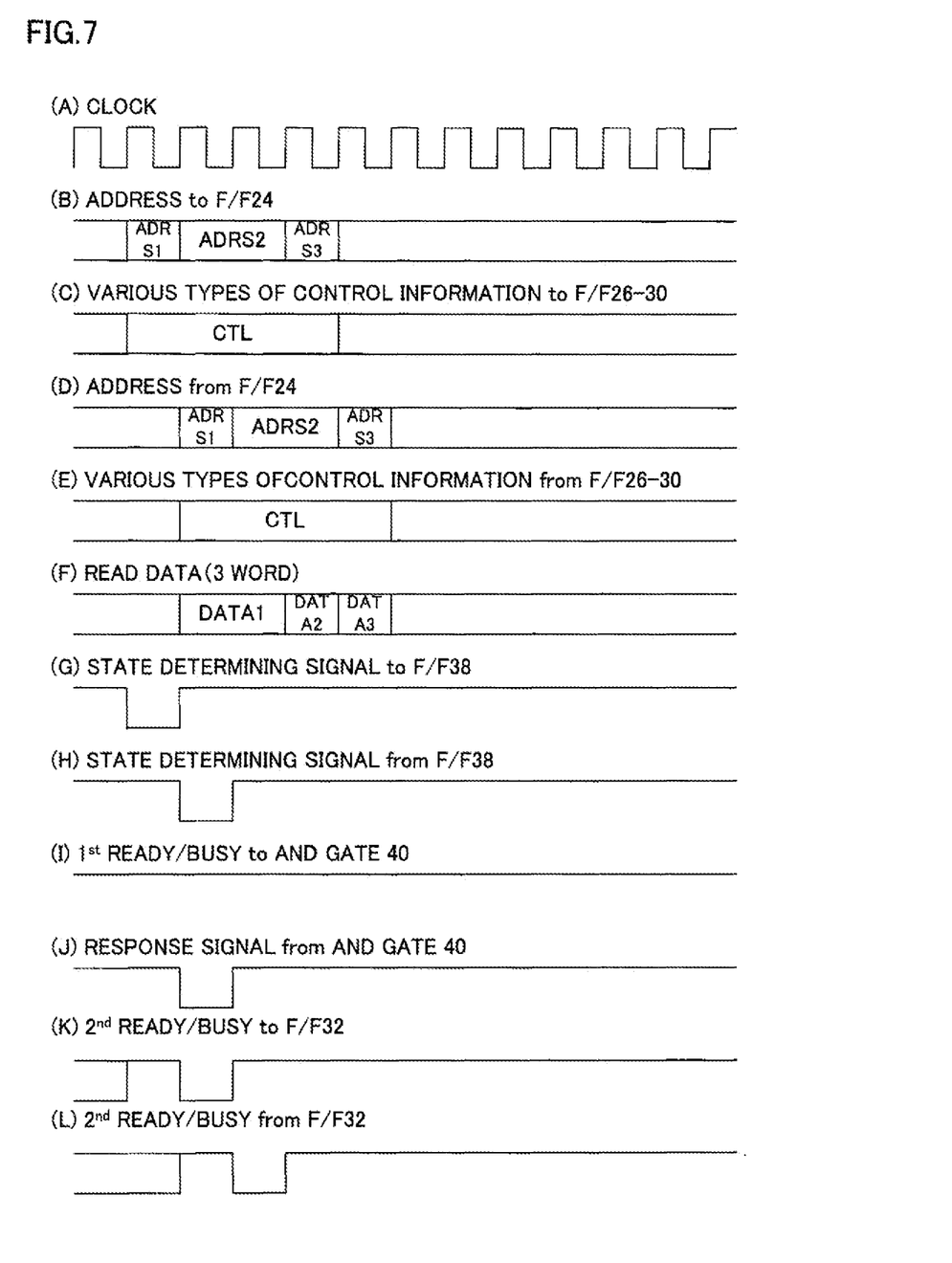
FIG. 7(A) is a timing chart showing another example of the output operation of the clock.
FIG. 7(B) is a timing chart showing another example of the output operation of the address from the processor.
FIG. 7(C) is a timing chart showing another example of the output operation of various types of control information from the processor.
FIG. 7(D) is a timing chart showing another example of the output operation of the address from the F/F circuit.
FIG. 7(E) is a timing chart showing another example of the output operation of various types of control information from the F/F circuit.
FIG. 7(F) is a timing chart showing another example of the output operation of reading-out data from the memory control circuit.
FIG. 7(G) is a timing chart showing another example of the output operation of the state determining signal from the state determining circuit.
FIG. 7(H) is a timing chart showing another example of the output operation of the state determining signal from the F/F circuit.
FIG. 7(I) is a timing chart showing another example of the output operation of the first ready/busy signal from the memory control circuit.
FIG. 7(J) is a timing chart showing another example of the output operation of the response signal from the AND gate.
FIG. 7(K) is a timing chart showing another example of the output operation of the second ready/busy signal from the processor.
FIG. 7(L) is a timing chart showing another example of the output operation of the second ready/busy signal from the F/F circuit.

With reference to FIG. 7(A) to FIG. 7(L), when the address information and the various types of control information corresponding to the three words are applied to the F/F circuit 24 and the F/F circuits 26 to 30 at timings shown in FIG. 7(B) and FIG. 7(C), the address information and the various types of control information are outputted from the F/F circuit 24 and the F/F circuits 26 to 30 at timings shown in FIG. 7(D) and FIG. 7(E) in response to a clock signal shown in FIG. 7(A).

The state determining circuit 36 creates a state determining signal shown in FIG. 7(G) based on the various types of control information shown in FIG. 7(C). The created state determining signal is delayed by 1-clock cycle by the F/F circuit 38, and is outputted from the F/F circuit 38 at a timing shown in FIG. 7(H).

The memory control circuit 16 outputs a first ready/busy signal shown in FIG. 7(I) based on the various types of control information applied from the I/F circuit 14. The AND gate 40 performs an AND operation on a state determining signal shown in FIG. 7(H) and the first ready/busy signal shown in FIG. 7(I), and outputs a response signal shown in FIG. 7(J) toward the processor 12.

The READY/BUSY generating circuit 12c creates a second ready/busy signal shown in FIG. 7(K) based on the response signal shown in FIG. 7(J). The created second ready/busy signal is delayed by 1-clock cycle by the F/F circuit 32, and outputted toward the memory control circuit 16 at a timing shown in FIG. 7(L).

As is seen from the above description, the memory access apparatus 10 includes the processor 12, the I/F circuit 14, and the memory control circuit 16. The processor 12 includes the access-request generating circuit 12b which issues the memory access request. The I/F circuit 14 includes the F/F circuits 24 to 30 each of which holds the memory access request outputted from the processor 12 in response to the clock signal. The memory control circuit 16 includes the access processing circuit 16a which executes the access process that complies with the memory access request held by the F/F circuits 24 to 30.

Moreover, the memory control circuit 16 further includes the READY/BUSY generating circuit 16b which outputs the first ready/busy signal by referring to the process state of the access processing circuit 16a. The I/F circuit 14 further includes the response-signal creating circuit 34 which creates the response signal based on the memory access request outputted from the access-request generating circuit 12b and the first ready/busy signal outputted from the READY/BUSY generating circuit 16b. The processor 12 further includes the READY/BUSY generating circuit 12c which outputs the second ready/busy signal based on the response signal created by the response-signal creating circuit 34.

Furthermore, the I/F circuit 14 further includes the F/F circuit 32 which holds the second ready/busy signal outputted from the READY/BUSY generating circuit 12c in response to the clock signal. The access processing circuit 16a executes the access process by referring to the second ready/busy signal held by the F/F circuit 32.

Moreover, the response-signal creating circuit 34 includes; the state determining circuit 36 which creates the state determining signal used for determining a state of the memory access request held by the F/F circuits 26 to 30; the F/F circuit 38 which holds the created state determining signal in response to the clock signal; and the AND gate 40 which creates the response signal by performing an AND operation on the state determining signal held by the F/F circuit 38 and the first ready/busy signal outputted from the READY/BUSY generating circuit 16b.

When the memory access request is held in response to the clock signal, the delay of the transfer operation of the memory access request is shortened to a cycle of the clock signal. Thereby, speeding-up of the memory access process is implemented.

Moreover, when the response signal is created based on the memory access request and the first ready/busy signal and the second ready/busy signal is created based on the response signal, coordination between the processor 12 and the memory control circuit 16 is secured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory access apparatus comprising:

a processor; an interface; and a memory control circuit;

an interface external to said processor and said memory control circuit; and a clock generator providing a clock signal common to said processor, said interface, and said memory control circuit for timing control, wherein said processor comprises an issuer which issues a memory access request, said memory access request being a memory read or write request, said interface comprises a first holder which holds the memory access request issued by said issuer processor in response to the clock signal, said memory control circuit comprises an access processor processing circuit which executes an access process in accordance that complies with the memory access request held by said first holder, and wherein said memory control circuit further comprises a first outputter which outputs a first ready/busy signal to said interface, the first ready/busy signal indicating whether said access processing circuit is ready to execute the memory access request by referring to a process state of said access processor, said interface further comprises a creator which creates a response signal to said processor based on the memory access request issued by said processor issuer and the first ready/busy signal outputted by said first outputter, and said processor further comprises a second outputter which outputs a second ready/busy signal to said interface based on the response signal created by said creator, the second ready/busy signal indicating acknowledgment by said processor for said memory control circuit to proceed with execution of the memory access request.

2. A memory access apparatus according to claim 1, wherein said interface further comprises a second holder which holds the second ready/busy signal outputted by said second outputter in response to the clock signal, and said access processing circuit processor executes the access process by referring to the second ready/busy signal held by said second holder.

3. A memory access apparatus according to claim 1, wherein said creator includes a first signal creator which creates a state identifying signal which identifies a state of the memory access request held by said first holder and a second signal creator which creates the response signal by performing an AND operation on the state identifying signal created by said first signal creator and the first ready/busy signal outputted by said first outputter.

4. A memory access apparatus according to claim 3, wherein said memory access request includes word count information in which a word count of access data is written, and the said first signal creator creates the state identifying signal different depending on the word count information.

\* \* \* \* \*